(12) United States Patent
Okusa et al.

(10) Patent No.: US 11,360,108 B2
(45) Date of Patent: Jun. 14, 2022

(54) AUTOMATED ANALYZER

(71) Applicant: HITACHI HIGH-TECH CORPORATION, Tokyo (JP)

(72) Inventors: Takenori Okusa, Tokyo (JP); Yoshihiro Yamashita, Tokyo (JP); Shunsuke Sasaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 175 days.

(21) Appl. No.: 16/482,979

(22) PCT Filed: Jan. 18, 2018

(86) PCT No.: PCT/JP2018/001312
§ 371 (c)(1),
(2) Date: Aug. 1, 2019

(87) PCT Pub. No.: WO2018/142944
PCT Pub. Date: Aug. 9, 2018

(65) Prior Publication Data
US 2020/0241022 A1    Jul. 30, 2020

(30) Foreign Application Priority Data
Feb. 6, 2017    (JP) .............................. JP2017-019185

(51) Int. Cl.
*G01N 35/00*    (2006.01)
(52) U.S. Cl.
CPC .................. *G01N 35/00613* (2013.01); *G01N 2035/00356* (2013.01)

(58) Field of Classification Search
None
See application file for complete search history.

(56) References Cited

U.S. PATENT DOCUMENTS

| | | | | |
|---|---|---|---|---|
| 5,635,364 A | * | 6/1997 | Clark ................. | B01F 11/0022 422/63 |
| 2003/0053933 A1 | | 3/2003 | Miyake et al. | |
| 2007/0183945 A1 | | 8/2007 | Li et al. | |

(Continued)

FOREIGN PATENT DOCUMENTS

| | | |
|---|---|---|
| JP | S61063140 U | 4/1986 |
| JP | H01201162 A | 8/1989 |

(Continued)

OTHER PUBLICATIONS

International Search Report of PCT/JP2018/001312, dated Apr. 10, 2018.

*Primary Examiner* — Kathryn Wright
(74) *Attorney, Agent, or Firm* — Miles & Stockbridge, P.C.

(57) ABSTRACT

It is necessary to dispose a plurality of units which have different target temperatures on an apparatus in a more integrated state in order to improve analysis performance and processing capacity per unit space of the apparatus. Therefore, it is necessary to mitigate influence of temperature exerted between units.

It is possible to reduce the temperature influence exerted between the units and thus efficiently control temperature by properly disposing the units in the apparatus, based on the relationship between a use environment temperature of the apparatus and a target temperature of each unit and temperature accuracy required for the unit.

17 Claims, 4 Drawing Sheets

(56) References Cited

U.S. PATENT DOCUMENTS

2019/0308194 A1\* 10/2019 Watanabe ............... F25D 17/02
2020/0105409 A1\* 4/2020 Kochar ................ G06Q 10/10

FOREIGN PATENT DOCUMENTS

| JP | H04116766 U | 10/1992 | |
|---|---|---|---|
| JP | 2003083979 A | 3/2003 | |
| JP | 2009525847 A | 7/2009 | |
| JP | 2010139332 A | 6/2010 | |
| JP | 2012112832 A | 6/2012 | |
| JP | 2016031334 A | 3/2016 | |
| WO | WO-2018017156 A1 \* | 1/2018 | .......... B01L 3/50853 |

\* cited by examiner

AUTOMATED ANALYZER

TECHNICAL FIELD

The present invention relates to a clinical automated analyzer that quantitatively or qualitatively analyzes a sample originated from a living body such as blood, urine, or the like.

BACKGROUND ART

In a clinical automated analyzer, controlling a reaction environment temperature during an analysis reaction process to a temperature suitable for each reaction process has a good influence on improvement in analysis performance. The suitable temperature is determined depending on each reaction process. Each unit that carries out each reaction process controls the reaction environment temperature so as to be a temperature suitable for each reaction process. Therefore, the target temperature of each unit and temperature accuracy to be required are dependent on the reaction process the unit takes charge of, and units for which various target temperatures and temperature accuracy are required are present in the same automated analyzer.

As a unit for which temperature accuracy is required, there is a unit in which a relatively-large range such as 2 to 3 degrees is acceptable as a difference between the upper-limit temperature and the lower-limit temperature with respect to the target temperature, or a unit in which only 0.3 degree or less is acceptable. In addition, there is a unit whose target temperature is higher or lower than the temperature of an environment where the apparatus is installed, namely, a use environment temperature.

On the other hand, there has been strong demand to reduce an operation cost when the analyzer is used, and as one demand, it has been required to increase analysis processing capability per unit space to a space where the apparatus occupies when being installed. As one method of increasing the analysis processing capability per unit space, it is conceivable to decrease the size of the apparatus while keeping the processing capability. In this case, it is necessary to arrange units in the apparatus by reducing intervals between the units in the apparatus as small as possible, and as a result, the units are likely to be mutually influenced by heat between the units.

Patent Literature 1 discloses an automated analyzer configured in such a manner that in order to allow cooling means of a reaction reagent unit to effectively function while realizing effective heat discharging, a cabinet is partitioned into an upper part that is a low-temperature part and a lower part that is a high-temperature part to accommodate a power supply/control unit generating heat and a duct into the lower part. In addition, the heat generated from the cooling means is discharged from the duct to the outside of the cabinet, and the heat generated from the power supply/control unit is discharged to the outside of the cabinet.

CITATION LIST

Patent Literature

Patent Literature 1: Japanese Unexamined Patent Application Publication No. 2003-083979

SUMMARY OF INVENTION

Technical Problem

When heat transfer occurs between units having different target temperatures to mutually influence the control temperatures of the units, there is a possibility that the efficiency of temperature control is deteriorated such as extension of time required to reach the target temperature or an increase in energy necessary for temperature control.

In the system described in Patent Literature 1, the heat discharging to the outside of the apparatus through the duct is described. However, Patent Literature 1 does not reduce mutual influence of heat generated between the units.

Solution to Problem

The invention of the application for solving the above-described problem is configured as follows. Namely, provided in an automated analyzer, comprising: a first temperature control unit and a second temperature control unit that each include a temperature adjusting mechanism including a heat exchange portion; an air suction duct that supplies air sucked from an air suction port to the heat exchange portion; an air discharge duct that discharges air from the heat exchange portion toward an air discharge port; and a control device that controls each temperature adjusting mechanism so that the first temperature control unit is set to be a first target temperature and the second temperature control unit is set to be a second target temperature higher than the first target temperature, wherein the first temperature control unit is disposed at a position closer to the air suction port than that of the second temperature control unit.

Advantageous Effects of Invention

By optimizing arrangement of a plurality of units having different target temperatures in an apparatus, temperature influence exerted between the units is reduced to realize effective temperature control.

DESCRIPTION OF EMBODIMENTS

In the embodiment, an automated analyzer will be described as an example. As the automated analyzer, there is, for example, a biochemical automated analyzer, an immune automated analyzer, or a genetic automated analyzer. However, these are only examples of the present invention. The present invention is not limited to the embodiment described below, and widely includes an apparatus that reacts a sample with a reagent to analyze the sample on the basis of the result of the reaction. For example, a mass spectroscope used for a clinical examination and a coagulation analyzer that measures coagulation time of blood are included. In addition, the present invention can be applied to a composite system obtained by combining these with a biochemical automated analyzer, an immune automated analyzer, and the like, or an automatic analytic system obtained by applying these.

Figure 1:
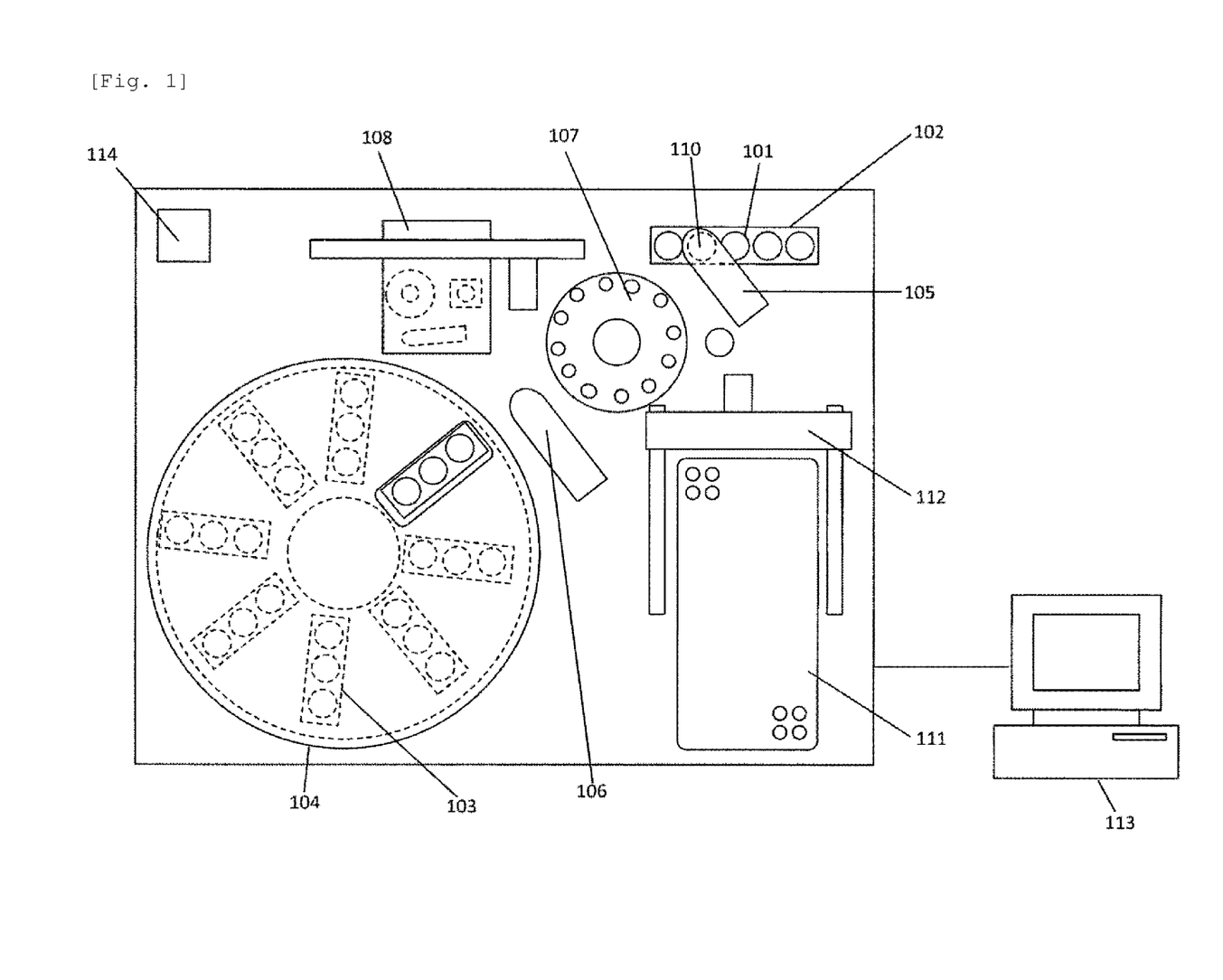
FIG. 1 is a view illustrating a configuration of an automated analyzer according to the invention.

FIG. 1 is an outline configuration diagram of an automated analyzer to which unit optimum arrangement of the embodiment is applied.

The automated analyzer includes a sample transport unit 102 that transports to a sample suction position 110 a sample container 101 for a blood collection tube in which a sample to be analyzed is contained, a reagent storage unit 104 that controls the temperature of a reagent container 103 containing a reagent used for an analysis so that the temperature of the reagent falls within a certain temperature range, a sample dispensing unit 105 that dispenses the sample in the sample container to a reaction container, a reagent dispensing unit 106 that dispenses the reagent in the reagent container to a reaction container, a reaction promotion unit 107 in which a reaction container containing a reaction solution obtained by mixing the sample with the reagent is installed so that the temperature of the reaction solution is controlled to fall within a certain temperature range, and a measurement unit 108 that optically measures the amount of substances in the reaction solution with the reaction promoted in the reaction promotion unit. In addition, arranged is an environment temperature measurement sensor for measuring the temperature of the surrounding environment where the automated analyzer is arranged. These units are controlled by a control device 113.

The sample transport unit 102 may be, for example, a sample rack in which one or a plurality of sample containers 101 is mounted, or a sample disk with one or a plurality of sample containers 101 arranged on the circumference thereof. In the case of the sample rack, the sample rack is transported to the suction position of the sample dispensing unit by a transport apparatus such as a transport belt mechanism or a robot arm.

The reagent storage unit 104 may be, for example, a unit in which a plurality of reagent containers is arranged on the circumference to transport an arbitrary reagent container to a desired position by being rotated, or may have a configuration in which the reagent containers are arranged in a line or a plurality of lines in the vertical and horizontal directions.

The measurement unit 108 optically measures the reaction solution as a target in a measurement flow channel in the unit, and the measurement is conducted in a state where the temperature of the reaction solution in the flow channel is controlled to be within a certain temperature range. As an example of a measurement operation, there is measurement of the absorbance of the reaction solution, measurement of the amount of light emission when a reagent is added or a voltage is applied to the reaction solution, measurement of the number of particles in the reaction solution, or measurement of fluctuations in current values and voltage values when the reaction solution comes into contact with an electrode film. Therefore, a photometric device such as a photomultiplier tube or a photometer, an imaging element such as a CCD, and an ammeter and a voltmeter measuring fluctuations in current values and voltage values are provided in the measurement unit 108.

The reaction promotion unit 107 promotes a stabilized reaction by keeping the temperature of the reaction container within a predetermined temperature range. For example, the reaction promotion unit 107 may be an incubator that controls temperatures by heating around a plurality of reaction containers by a heater or the like in a state where the reaction containers are arranged on a circumference, or a thermostatic bath in which reaction containers are dipped in a bath where a liquid with the temperature controlled in a constant range circulates.

When the sample dispensing unit dispenses a sample, a dispensing chip that can be exchanged every time the sample is changed is used for a part that comes into contact with the sample, or an unused reaction container is used each time for a reaction container that reacts the sample with the reagent in some cases depending on analytic performance required for the analyzer in consideration of an effect of carry-over between the samples. In this case, the dispensing chip or the reaction container that was used once is discarded. A new dispensing chip or reaction container necessary for executing an analysis for a certain period of time is stored in the consumable storage unit 111, and the consumable transport unit 112 appropriately supplies the dispensing chip or the reaction container to a place where these are used.

Figure 2A:
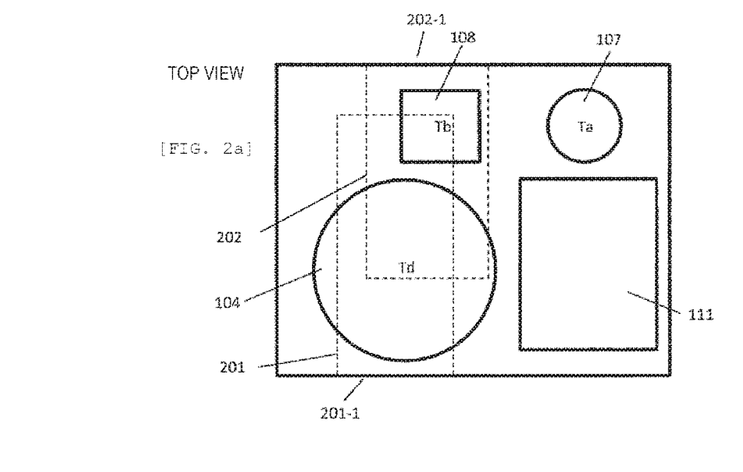
FIGS. 2(a) to 2(c) are views illustrating a disposition of an air suction duct and an air discharge duct.
Figure 2B:
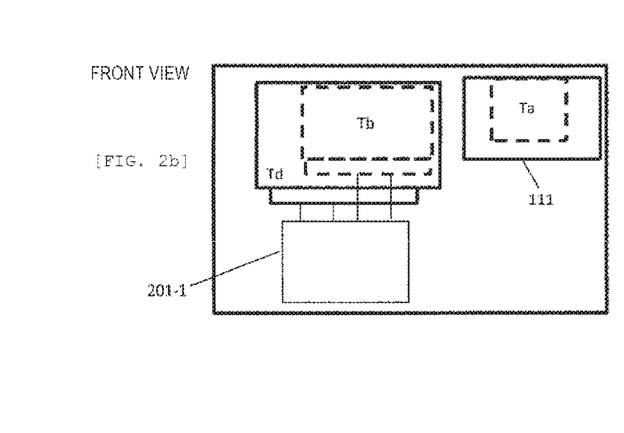
Figure 2C:
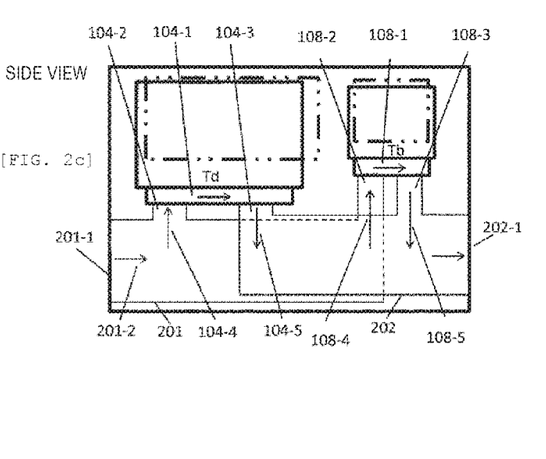

Next, arrangement of units and ducts that need temperature control in the present invention is shown in FIGS. 2(a) to 2(c).

In order to promote the reaction of the reaction solution obtained by mixing the sample with the reagent, the reaction promotion unit 107 needs to control the temperature of the reaction solution to fall within a certain range during the reaction of the reaction solution. The target temperature Ta thereof is, for example, 37° C., and the allowable temperature accuracy TaΔ thereof is less than ±0.5° C., which means that extremely high-accurate temperature control is required.

The measurement unit 108 is required to control the target temperature Tb of the reaction solution in the measurement flow channel at the time of the measurement to be 28° C., and the allowable temperature accuracy TbΔ thereof is less than about ±1° C.

The reagent storage unit 104 needs to store the reagent in a proper temperature state. Therefore, the target temperature Td of the reagent installed in the reagent storage unit 104 is required to be, for example, 7.5° C., and the temperature accuracy TdΔ thereof is required to be ±2.5° C. in the reagent storage unit 104. Namely, the temperature of the reagent is controlled so as to be kept in a range of 5 to 10° C.

As described above, the units having different target temperatures and temperature accuracies are arranged in the same automated analyzer.

In a clinical automated analyzer, the temperature of the surrounding environment where the apparatus is used, namely, a use environment temperature T is generally specified, and it is required to use the apparatus in the range of the use environment temperature. The temperature range is, for example, from 15° C. to 32° C. that is wider than the temperature range required for each unit in some cases. Therefore, cooling control or heating control is required for each unit depending on the target temperature and use environment temperature of each unit.

For example, the target temperature Td of the reagent storage unit 104 is 7.5° C. Therefore, it is necessary to cool the clinical automated analyzer even in the case where the apparatus is used in the environment of the lowest use environment temperature of 15° C. Namely, the cooling control is always needed as long as the apparatus is used within the use environment temperature. The target temperature Ta of the reaction promotion unit 107 is 37° C., and the heating control is needed even in the case where the apparatus is used in the environment of the highest use environment temperature of 32° C. Namely, in the case where the apparatus is used within the use environment temperature, the heating control is always needed. On the other hand, the target temperature Tb of the measurement unit 108 is 28° C. The heating control is needed when the use environment temperature T is 15° C., and the cooling control is needed when the use environment temperature is 32° C.

As a temperature adjusting mechanism for the temperature control, a heat exchange element such as a Peltier element can be used in the unit for which the cooling control is needed. The heat exchange element includes a heat exchange portion that performs heat exchange between a unit controlling the temperature and the outside of the unit. In the case where the heat exchange element performs the cooling control for the unit, the heat exchange portion discharges the heat to the outside of the unit. On the contrary, in the case where the heat exchange element performs the heating control for the unit, the heat exchange portion absorbs the heat from the outside of the unit. When the heat discharge and the heat absorption generated in the heat exchange portion influence the temperature of a unit other than those for which the temperature control is performed, there is a possibility that the temperature control of the unit becomes unstable or more energy is needed due to the temperature control. In order to reduce the influence, provided are an air suction duct and an air discharge duct through which air for heat exchange to discharge the heat generated by the heat exchange of the units to the outside of the apparatus flows.

A duct arrangement state in the automated analyzer in the present invention is shown in FIGS. 2(a) to 2(c). The ducts of the present invention include an air suction duct 201 and an air discharge duct 202 that are formed while being separated from each other.

The air suction duct 201 has a duct air suction port 201-1 for taking in the outside air at a side face of the apparatus. In addition, the air suction duct 201 is connected to unit air suction ports 104-2 and 108-2 to feed the outside air taken in from the air suction duct 201 to temperature control units 104-1 and 108-1 provided in the reagent storage unit 104 and the measurement unit 108, respectively.

The air discharge duct 202 includes a duct disposal port 202-1 for discharging the air at a rear surface of the apparatus. In addition, the air discharge duct 202 is connected to unit air discharge ports 104-3 and 108-3 of temperature control units 104-1 and 108-1 provided in each unit to feed the discharge heat generated from the reagent storage unit 104 and the measurement unit 108.

The movement of a gas flowing in the duct in the invention of the application will be described. A part of air 201-2 taken in from the duct air suction port 201-1 of the air suction duct reaches the unit air suction port 104-2 of the reagent storage unit 104 through the air suction duct 201 (arrow 104-4). The rest of the air reaches the unit air suction port 108-2 of the measurement unit through the air suction duct 201 (arrow 108-4). The heat exchange is performed for the air taken into the unit air suction ports 104-2 and 108-2 between the temperature control units 104-1 and 108-1 during a period of time when the air moves towards the unit air discharge ports 104-3 and 108-3.

The air (arrows 104-5 and 108-5) discharged from the unit air discharge port is influenced by the temperature from each temperature control unit. For example, in the case where the temperature control unit performs the cooling control, the heat is discharged from the temperature control unit to the air, and the temperature of the air of the unit air discharge port becomes higher than that of the unit air suction port. On the other hand, in the case where the temperature control unit performs the heating control, the heat is absorbed from the air to the temperature control unit, and the temperature of the air on the unit air discharge port side becomes lower than that of the unit air suction port. The air discharged from the unit air discharge port is discharged from the duct air discharge port 202-1 to the outside of the apparatus through the air discharge duct 202 (arrows 104-5 and 108-5).

Since the heat exchange is performed between the air and the heat exchange portion during a period of time when the air passes through each of the temperature control units 104-1 and 108-1, the temperature of the air flowing in the air discharge duct 202 is not stabilized. Therefore, it is possible to reduce the influence on the apparatus by the unstable air temperature in the air discharge duct can be reduced by winding a heat insulator around the air discharge duct.

In addition, the unit (for example, the reaction promotion unit 107) for which temperature management with higher accuracy is required can reduce the influence of the temperature of the discharged air flowing in the air discharge duct by being arranged at a position that is physically separated from the air discharge duct 202. In particular, the inside of the apparatus is largely influenced by the convention of the air, and heat transfer is increased in the vertical direction (gravity direction). Therefore, the air discharge duct 202 and the reaction promotion unit 107 are arranged so that the projection surface of the air discharge duct 202 is not overlapped with the projection surface of the reaction promotion unit 107 for which temperature control with high accuracy is required in a top view obtained by viewing the apparatus from the gravity direction. Accordingly, the influence of the heat exerted on the reaction promotion unit 107 by the air discharge duct can be suppressed, and it is possible to effectively perform the temperature control with high accuracy. It should be noted that even in the case where there is another unit for which temperature management with high accuracy is required, it is effective to arrange the unit at a position that is physically separated from the air discharge duct as similar to the reaction promotion unit.

Figure 3A:
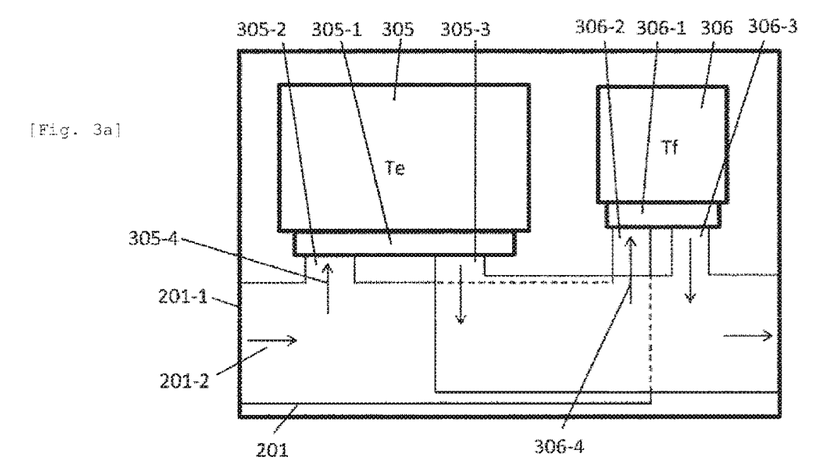
FIGS. 3(a) and 3(b) are views illustrating a disposition of a plurality of temperature control units for cooling.
Figure 3B:
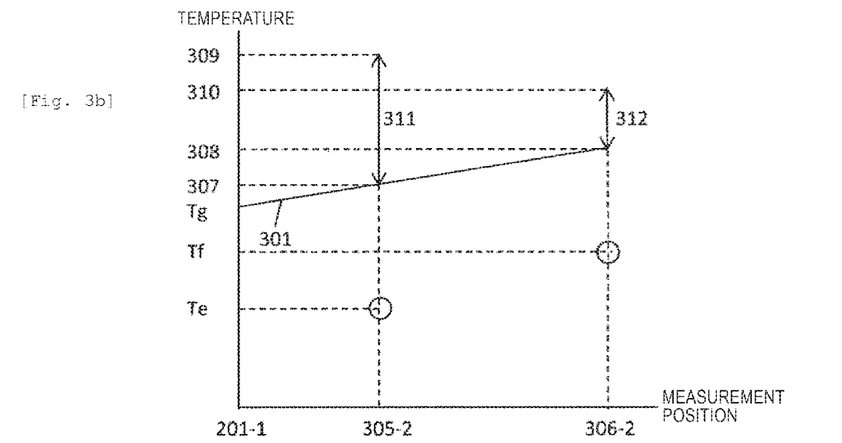

Next, arrangement of a plurality of units having target temperatures lower than the environment temperature Tg of the apparatus will be described using FIGS. 3(a) and 3(b).

In the embodiment, the reagent storage unit 305 and the measurement unit 306 having target temperatures lower than the environment temperature Tg of the apparatus will be described as an example. It is assumed that the target temperature of the reagent storage unit is Te and the target temperature of the measurement unit is Tf. In order to control these units to be at the target temperatures, each of temperature control units 305-1 and 306-1 performs the cooling control. In the case of Te<Tf, it is conceivable that more discharged air is generated from the reagent storage unit 305 as compared to that from the measurement unit 306.

In general, a number of heat sources such as motors and solenoid valves are arranged in the automated analyzer, and the temperature inside the apparatus is higher than that outside the apparatus in many cases. Therefore, as shown in FIG. 3(b), the temperature 301 of air 201-2 taken into the air suction duct 201 from the duct air suction port 201-1 is the same as the use environment temperature Tg in the duct air suction port, but the temperature tends to be increased at a position apart from the duct air suction port.

As temperature differences 311 and 312 between the temperatures of the air (arrows 305-4 and 306-4) flowing in from the unit air suction port and the temperatures 309 and 310 of the heat exchange portions of the temperature control units are larger, more heat can be effectively discharged. Therefore, the reagent storage unit 305 having a lower target temperature is arranged at a position near the duct air suction port 201-1. Since a difference between the target temperature of the measurement unit 306 and the use environment temperature of the apparatus is relatively small, the amount of heat discharged from the heat exchange portion of the measurement unit 306 is small, and the heat exchange can be sufficiently and effectively performed even if a temperature difference from the air is small.

Accordingly, the heat exchange efficiency of the entire apparatus can be enhanced. In addition, without being limited to the reagent cooling unit 305 and measurement unit 306, in the case where a plurality of temperature control units that needs to be cooled is arranged in the apparatus, the heat exchange efficiency of the entire apparatus can be enhanced by installing a unit having a larger difference between the target temperature and the use environment temperature Tg of the apparatus at a position near the duct air suction port.

Figure 4A:
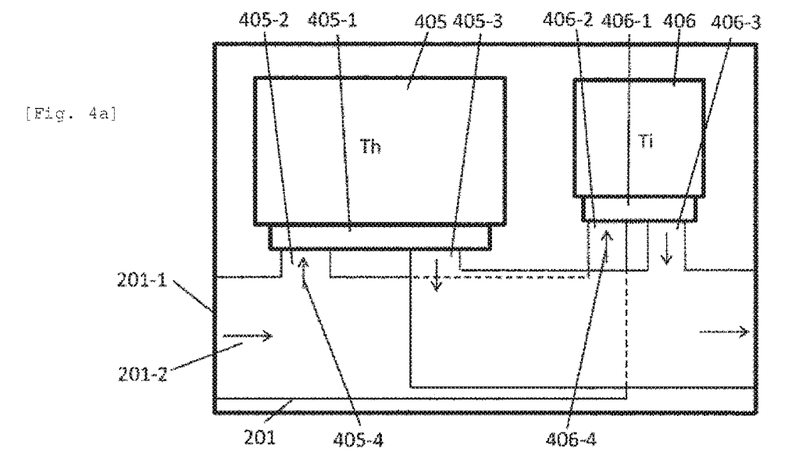
FIGS. 4(a) and 4(b) are views illustrating a disposition of the temperature control unit for cooling and a temperature control unit for heating.
Figure 4B:
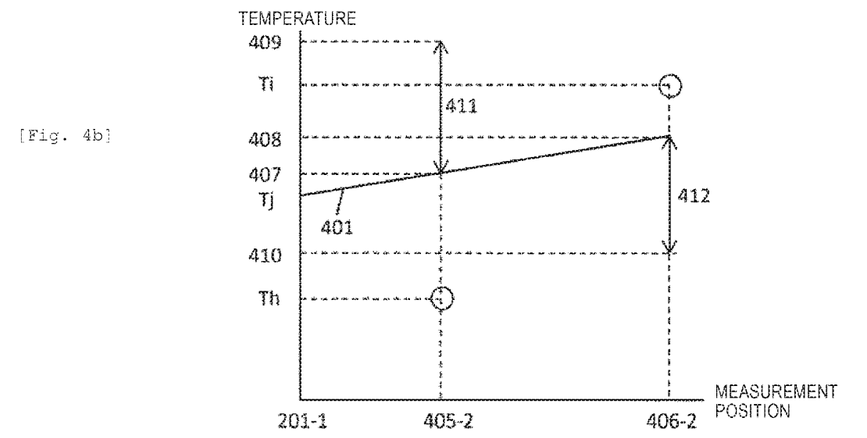

Next, arrangement positions in the case where a unit having a target temperature lower than the use environment temperature Tj of the apparatus and a unit having a target temperature higher than the use environment temperature Tj are arranged will be described using FIGS. 4(a) and 4(b).

In the embodiment, a reagent storage unit 405 having a target temperature (Th) lower than the environment temperature Tj of the apparatus and a measurement unit 406 having a target temperature (Ti) higher than the environment temperature will be described as an example.

Since a temperature control unit 406-1 performs the heating control in the measurement unit 406 having the higher target temperature (Ti), the air is sucked during a period of time when the air flows from a unit air suction port 406-2 to a unit air discharge port 406-3. Therefore, as the temperature of the air (arrow 406-4) entering from the unit air suction port 406-2 is higher, the efficiency of the heat exchanged performed in the unit is improved.

As described above, in the case where the reagent storage unit 405 for which the cooling control is performed at the target temperature Th and the measurement unit 406 for which the heating control is performed at the target temperature Ti are arranged in the apparatus, it is desirable that the reagent storage unit 405 that needs the cooling control is installed at a position near the duct air suction port 201-1 and the measurement unit 406 that needs the heating control is installed at a position apart from the duct air suction port 201-1.

Accordingly, the air having a low temperature 407 can be supplied to the temperature control unit that needs to be cooled (arrow 405-4), and the air having a high temperature heated in the apparatus can be supplied to the temperature control unit that needs the heating control (arrow 406-4). By doing so, temperature differences 411 and 412 between each heat exchange portion and the air can be made larger, and the efficiency of the heat exchange can be enhanced. In addition, without being limited to the reagent cooling unit 405 and measurement unit 406, in the case where a plurality of units that needs a cooling process and a plurality of units that needs a heating process are installed on the apparatus, the units that need the cooling process are arranged at positions nearer the duct air suction port than the units that need the heating process, and a unit having a larger difference between the target temperature and the use environment temperature among those that need the cooling process is installed at a position near the duct air suction port. Accordingly, the efficiency of the heat exchange of the entire apparatus can be enhanced. Likewise, a temperature control unit having a larger difference between the target temperature and the use environment temperature among those that perform the heating operation is installed at a position apart from the duct air suction port. Accordingly, the efficiency of the heat exchange can be further enhanced.

If the concept of the present invention is further extended, in the case where a unit A that always needs to be cooled irrespective of the use environment temperature, a unit B that always needs to be heated irrespective of the use environment temperature, and a unit C that needs to be controlled by switching between cooling and heating depending on the use environment temperature are arranged on the analyzer, it is desirable to arrange the units A, C, and B in this order with respect to the duct air suction port along the upper surface projection route of the air suction duct. In addition, in the case where there is a unit D that needs to be controlled with temperature accuracy higher than the units A to C, it is desirable to arrange the unit D at a position apart from the upper surface projection route of the air discharge duct through which the discharged heat of the units A to C passes through.

In addition, in the case where the air supplied from the air suction duct is used for heat discharge, the heat exchange efficiency is improved if the air having a lower temperature is sucked. Therefore, it is preferable that the air sucked from the duct air suction port is not influenced by the heat from the apparatus. In a more desirable manner, the influence of the heat exerted on the sucked air by the apparatus is reduced by positioning the duct air suction port of the air suction duct at a front surface of the apparatus, and thus the air having a temperature nearer the use environment temperature can be sucked. In addition, the efficiency of the temperature control in the temperature control unit can be improved. In this case, the duct air discharge port is positioned at a rear surface of the apparatus.

In addition, it is desirable that the duct air suction port is provided with a filter to remove dust so that foreign substances such as duct flying in the air are not sucked into the apparatus. In this case, it is desirable that the dust collected in the filter is regularly cleaned and removed, and the air suction port is provided at a front surface of the apparatus where a user can easily access in consideration of access to the filter.

In addition, since the air influenced by the discharged heat and the sucked heat at the heat exchange portion of the temperature control unit flows in the air discharge duct and the duct air discharge port, the temperatures of the air discharge duct and the duct air discharge port are not stabilized. In order to reduce the influence on the temperature control unit arranged in the apparatus, it is preferable to add a heat insulator to the duct and the duct air discharge port. Specifically, it is conceivable to wind the heat insulator around the duct. In addition, the duct air discharge port is provided on a surface opposite to the surface of the apparatus where the duct air suction port is provided, so that the air discharged from the air discharge port to the outside of the apparatus spreads to a place apart from the apparatus, or the air discharged from the duct air discharge port to the outside of the apparatus is sucked again from the duct air suction port. Accordingly, it is possible to prevent the influence on the temperature of the unit.

In addition, the duct air discharge port may be provided with a fan to allow the air in the air discharge duct to aggressively flow to the outside of the apparatus. Accordingly, the air that exists in the air discharge duct and whose temperature is unstable can be more effectively discharged to the outside of the apparatus, and it is possible to reduce the influence of the discharged air on the unit in the apparatus that needs temperature control.

It should be noted that the immune automated analyzer has been described as an example in the embodiment. However, the present invention can be applied to other analyzer es as described above. As apparatuses to which the present invention can be applied, there are a biochemical analyzer, a genetic analyzer, a mass spectroscope, a coagulation analyzer, and the like. In addition, the present invention can be applied to a sample preprocessing system and the like to perform preprocessing of a biological sample other than the analyzer. Such an apparatus includes various temperature management mechanisms such as, for example, a reagent storage that stores a reagent, a sample storage that stores a biological sample, a reaction solution storage unit that stores a reaction solution of a reagent and a sample, a stirring mechanism that performs a stirring process for a liquid such as a reagent or a sample, a separation mechanism that removes impurities in a reaction solution, a measurement mechanism that performs a measurement process for a reaction solution, a centrifugal processing mechanism that performs a centrifugal process for a biological sample, and a preprocessing mechanism that performs preprocessing for a biological sample. The present invention can be applied to all of the mechanisms, and the arrangement can be determined on the basis of a relation between the environment temperature of the apparatus and the target temperature.

REFERENCE SIGNS LIST 101 sample container
102 sample transport unit
103 reagent container
104 reagent storage unit
104-1 temperature control unit of reagent storage unit
104-2 unit air suction port of reagent storage unit
104-3 unit air discharge port of reagent storage unit
104-4 air taken into unit air suction port of reagent storage unit from air suction duct
104-5 air discharged to duct for air discharge from unit air discharge port of reagent storage unit
105 sample dispensing unit
106 reagent dispensing unit
107 reaction promotion unit
108 measurement unit
108-1 temperature control unit of measurement unit
108-2 unit air suction port of measurement unit
108-3 unit air discharge port of measurement unit
108-4 air taken into unit air suction port of measurement unit from air suction duct
108-5 air discharged to air discharge duct from unit air discharge port of measurement unit
110 sample suction position
111 consumable storage unit
112 consumable transport unit
113 control device
114 environment temperature measurement sensor
201: air suction duct
201-1 duct air suction port
201-2 air sucked from duct air suction port
202 air discharge duct
202-1 duct air discharge port
301 temperature of air in air suction duct
305 temperature control unit
306 temperature control unit
302 use environment temperature
305-1 temperature control unit
306-2 temperature control unit
305-2 unit air suction port
306-2 unit air suction port
305-3 unit air discharge port
306-3 unit air discharge port
305-4 air introduced from unit air suction port
306-4 air introduced from unit air suction port
307 temperature of air of unit air suction port
308 temperature of air of unit air suction port
309 temperature of heat exchange portion
310 temperature of heat exchange portion
311 difference between temperature of air of suction port and temperature of heat exchange portion
312 difference between temperature of air of suction port and temperature of heat exchange portion
401 temperature of air in air suction duct
405 temperature control unit
406 temperature control unit
402 use environment temperature
405-1 temperature control unit
406-2 temperature control unit
405-2 unit air suction port
406-2 unit air suction port
405-3 unit air discharge port
406-3 unit air discharge port
405-4 air introduced from unit air suction port
406-4 air introduced from unit air suction port
407 temperature of air of unit air suction port
408 temperature of air of unit air suction port
409 temperature of heat exchange portion
410 temperature of heat exchange portion
411 difference between temperature of air of suction port and temperature of heat exchange portion
412 difference between temperature of air of suction port and temperature of heat exchange portion

The invention claimed is:

1. An automated analyzer, comprising:
a first temperature control unit comprising a first measurement unit and a first temperature adjusting mechanism including a first heat exchange device;
a second temperature control unit comprising a second measurement unit having a photometric device configured to perform optical measurements and a second temperature adjusting mechanism which includes a second heat exchange device;
an air suction duct constructed to supply air sucked from an air suction port to the first heat exchange device and the second heat exchange device;
an air discharge duct formed separated from the air suction duct to discharge air from the first heat exchange device toward an air discharge port and to discharge air from the second heat exchange device toward the air discharge port; and
a control device configured to control the first temperature adjusting mechanism so that the first temperature control unit is set to a first target temperature and the second temperature adjusting mechanism so that the second temperature control unit is set to a second target temperature higher than the first target temperature,
wherein the first temperature control unit is disposed at a position closer to the air suction port than a position of the second temperature control unit, and
wherein the control device is further configured to
operate a sensor configured to measure a surrounding environment temperature external to the automated analyzer,
set in advance a predetermined surrounding environment temperature range, and
control the first temperature adjusting mechanism of the first temperature control unit so that the first temperature control unit is always set to a target temperature lower than the surrounding environment temperature range.

2. The automated analyzer according to claim 1,
wherein the control device is further configured to control switching between heating control and cooling control with respect to the temperature adjusting mechanism of the second temperature control unit depending on the surrounding environment temperature measured by the sensor.

3. The automated analyzer according to claim 1, further comprising:
a third temperature control unit comprising an incubator or a thermostatic bath managed with temperature accuracy higher than those of the first and the second temperature control units, and
wherein the third temperature control unit is disposed at a position which does not overlap with the air discharge duct in a top plan view.

4. The automated analyzer according to claim 1,
wherein the air suction port of the air suction duct and the air discharge port of the air discharge duct of an air duct of the automated analyzer are provided on opposite sides of the air duct with respect to each other.

5. The automated analyzer according to claim 4,
wherein the air suction port of the air suction duct is disposed on a front surface side of the automated analyzer and the air discharge port of the air discharge duct is disposed on a rear surface side of the automated analyzer.

6. The automated analyzer according to claim 1, further comprising:
a reagent storage apparatus,
wherein the reagent storage apparatus is positioned on a downstream side of air flow in the air suction duct as seen from the air suction port of the air suction duct and is positioned on an upstream side of air flow in the air discharge duct as seen from the air discharge port of the air discharge duct.

7. The automated analyzer according to claim 1,
wherein the first temperature control unit is a reagent storage apparatus configured to cool and store reagents used for an analysis of samples.

8. The automated analyzer according to claim 1,
wherein the photometric device of the second measurement unit of the second temperature control unit is configured to measure a reaction solution of the sample and the reagent.

9. The automated analyzer according to claim 3,
wherein the third temperature control unit is a reaction promotion unit comprising an incubator or a thermostatic bath constructed to promote a reaction of the sample and the reagent.

10. An automated analyzer, comprising:
a first temperature control unit comprising a first measurement unit and a first temperature adjusting mechanism which includes a first heat exchange device;
a second temperature control unit comprising a second measurement unit having a photometric device configured to perform optical measurements and a second temperature adjusting mechanism which includes a second heat exchange device;
an air suction duct constructed to supply air sucked from an air suction port to the first heat exchange device and the second heat exchange device;
an air discharge duct constructed to discharge air from the first heat exchange device toward an air discharge port and to discharge air from the second heat exchange device toward the air discharge port;
a control device configured to control the first temperature adjusting mechanism so that the first temperature control unit is set to a first target temperature and the second temperature adjusting mechanism so that the second temperature control unit is set to a second target temperature higher than the first target temperature; and
a third temperature control unit comprising an incubator or a thermostatic bath managed with temperature accuracy higher than those of the first and the second temperature control units,
wherein, in a top plan view, the first temperature control unit is disposed at a first position with respect to the air suction port, the second temperature control unit is disposed at a second position which is farther distanced from said air suction port than said first position, and the third temperature control unit is disposed at a third position which is farther distanced from said air suction port than said second position, and
wherein the control device is further configured to
operate a sensor configured to measure a surrounding environment temperature external to the automated analyzer,
set in advance a predetermined surrounding environment temperature range, and
control the first temperature adjusting mechanism of the first temperature control unit so that the first temperature control unit is always set to a target temperature lower than the surrounding environment temperature range.

11. The automated analyzer according to claim 10,
wherein the control device is further configured to control switching between heating control and cooling control with respect to the second temperature adjusting mechanism of the second temperature control unit depending on the surrounding environment temperature measured by the sensor.

12. The automated analyzer according to claim 10,
wherein the air suction port of the air suction duct and the air discharge port of the air discharge duct of an air duct of the automated analyzer are provided on opposite sides of the air duct with to each other.

13. The automated analyzer according to claim 12,
wherein the air suction port of the air suction duct is disposed on a front surface side of the automated analyzer and the air discharge port of the air discharge duct is disposed on a rear surface side of the automated analyzer.

14. The automated analyzer according to claim 10, further comprising:
a reagent storage apparatus,
wherein the reagent storage apparatus is positioned on a downstream side of air flow in the air suction duct as seen from the air suction port of the air suction duct and is positioned on an upstream side of air flow in the air discharge duct as seen from the air discharge port of the air discharge duct.

15. The automated analyzer according to claim 10,
wherein the first temperature control unit is a reagent storage apparatus configured to cool and store reagents used for an analysis of samples.

16. The automated analyzer according to claim 10,
wherein the photometric device of the second measurement unit of the second temperature control unit is configured to measure a reaction solution of the sample and the reagent.

17. The automated analyzer according to claim 10, wherein the third temperature control unit is a reaction promotion unit comprising an incubator or a thermostatic bath constructed to promote a reaction of the sample and the reagent.

\* \* \* \* \*